(12) United States Patent
Paterson et al.

(10) Patent No.: US 11,550,733 B2
(45) Date of Patent: Jan. 10, 2023

(54) METHOD, SYSTEM AND CIRCUIT FOR MANAGING A SECURE MEMORY PARTITION

(71) Applicant: Arm Limited, Cambridge (GB)

(72) Inventors: Richard Andrew Paterson, Thurgoland (GB); Rainer Herberholz, Great Abington (GB); Peter Andrew Rees Williams, Great Abington (GB); Oded Golombek, Even Yehuda (IL); Einat Luko, Herzllya (IL)

(73) Assignee: Arm Limited, Cambridge (GB)

( * ) Notice: Subject to any disclaimer, the term of this patent is extended or adjusted under 35 U.S.C. 154(b) by 16 days.

(21) Appl. No.: 16/918,938

(22) Filed: Jul. 1, 2020

(65) Prior Publication Data

US 2022/0004622 A1     Jan. 6, 2022

(51) Int. Cl.
| | | |
|---|---|---|
| *G06F 12/14* | (2006.01) | |
| *G06F 21/53* | (2013.01) | |
| *G06F 21/56* | (2013.01) | |
| *G06F 21/75* | (2013.01) | |
| *G06F 21/76* | (2013.01) | |

(52) U.S. Cl.
CPC ...... *G06F 12/1458* (2013.01); *G06F 12/1416* (2013.01); *G06F 12/1441* (2013.01); *G06F 21/53* (2013.01); *G06F 21/565* (2013.01); *G06F 21/75* (2013.01); *G06F 21/76* (2013.01)

(58) Field of Classification Search
CPC ........ G06F 21/00; G06F 21/53; G06F 21/567; G06F 21/60; G06F 21/604; G06F 21/606; G06F 12/14; G06F 12/1416; G06F 12/1425; G06F 12/1433; G06F 12/1441; G06F 12/1458
See application file for complete search history.

(56) References Cited

U.S. PATENT DOCUMENTS

| | | | | |
|---|---|---|---|---|
| 5,530,904 | A * | 6/1996 | Koga .................... | G06F 13/385 710/52 |
| 10,331,578 | B2 * | 6/2019 | Arora ...................... | G06F 21/62 |
| 10,691,813 | B2 | 6/2020 | Chhabra et al. | |
| 11,036,625 | B1 * | 6/2021 | Balluchi ............. | G06F 12/1063 |
| 2002/0082917 | A1 * | 6/2002 | Takano ............... | G07F 17/0014 705/26.1 |
| 2002/0161972 | A1 * | 10/2002 | Talagala .............. | G06F 11/1076 711/114 |

(Continued)

FOREIGN PATENT DOCUMENTS

| | | |
|---|---|---|
| EP | 3462362 A1 | 3/2019 |
| WO | 2020002427 A1 | 1/2020 |

OTHER PUBLICATIONS

Introduction to Application Specifi c IntegrateCircuit (ASIC) by Elprocus (Year: 2019).*

(Continued)

*Primary Examiner* — Paul M Knight
(74) *Attorney, Agent, or Firm* — Berkeley Law & Technology Group, LLP

(57) ABSTRACT

Disclosed are methods, systems and devices for storing states in a memory in support of applications residing in a trusted execution environment (TEE). In an implementation, one or more memory devices accessible by a memory controller may be shared between and/or among processes in an untrusted execution environment (UEE) and a TEE.

21 Claims, 3 Drawing Sheets

(56) References Cited

U.S. PATENT DOCUMENTS

| | | | | |
|---|---|---|---|---|
| 2004/0205203 | A1* | 10/2004 | Peinado | G06F 12/1483 709/229 |
| 2006/0117156 | A1* | 6/2006 | Chai | G06F 12/1425 711/163 |
| 2008/0170459 | A1* | 7/2008 | Ikeda | G11C 11/413 365/227 |
| 2009/0063799 | A1* | 3/2009 | Berenbaum | G06F 12/1441 711/163 |
| 2010/0165748 | A1* | 7/2010 | Thiruvengadam | G11C 8/10 365/185.33 |
| 2010/0223438 | A1* | 9/2010 | Vermeulen | G06F 12/145 711/E12.098 |
| 2011/0109361 | A1* | 5/2011 | Nishio | H03K 19/00361 327/170 |
| 2011/0296105 | A1* | 12/2011 | Yen | G06F 11/2087 711/114 |
| 2012/0057412 | A1* | 3/2012 | Romanovskyy | G11C 7/10 365/189.05 |
| 2015/0186295 | A1* | 7/2015 | Savagaonkar | G06F 21/74 713/193 |
| 2018/0329708 | A1* | 11/2018 | Burger | G06F 12/1009 |
| 2019/0065396 | A1* | 2/2019 | Troia | G06F 3/061 |
| 2019/0164614 | A1* | 5/2019 | Prasad | G11C 29/028 |
| 2020/0089503 | A1* | 3/2020 | Gupta | G06F 9/3804 |
| 2020/0201789 | A1* | 6/2020 | Durham | H04L 9/3242 |
| 2021/0149800 | A1* | 5/2021 | Yang | G06F 11/1446 |
| 2021/0200546 | A1* | 7/2021 | Lemay | G06F 16/9017 |

OTHER PUBLICATIONS

How to: Difference between RDIMM and UDIMM by Florin (Year: 2013).*
Application Specific Integrated Circuits by Smith (Year: 1997).*
HTPM: Hybrid Implementation of Trusted Platform Module by Kim (Year: 2019).*
Scalability Evaluation of FPGA based MultiCore Architecture by Kliem (Year: 2014).*
A Hijackers guide to communication interfaces TPM 2011 by Winter (Year: 2011).*
Extended European Search Report, App. No. 21179621.4, dated Nov. 29, 2021, 6 Pages.
Response to Communication pursuant to Rule 69 EPC and invitation pursuant to Rule 70a(1) EPC, App. No. EP21179621.4, Filed Apr. 12, 2022, 15 Pages.

* cited by examiner

METHOD, SYSTEM AND CIRCUIT FOR MANAGING A SECURE MEMORY PARTITION

BACKGROUND

1. Field

Disclosed are devices and techniques for secure storage of values and/or parameters in a secure partition of a memory device.

2. Information

Mobile applications increasingly rely on security features in mobile devices (e.g., mobile handheld devices (e.g., Smartphones) and mobile devices to support an "Internet of Things" (IoT) application) to enable an application to be executed in a trusted execution environment (TEE). For example, a mobile device may at least in part implement a TEE using a "secure enclave" comprising a combination of software and hardware features integrated to provide an isolated computing environment within a larger computing environment enabling one or more guarantees for applications executing within the secure enclave computing device. In an example implementation, such a secure enclave may access and/or maintain a secure memory that is hardened from malicious and/or inadvertent actions to access and/or corrupt stored memory states.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
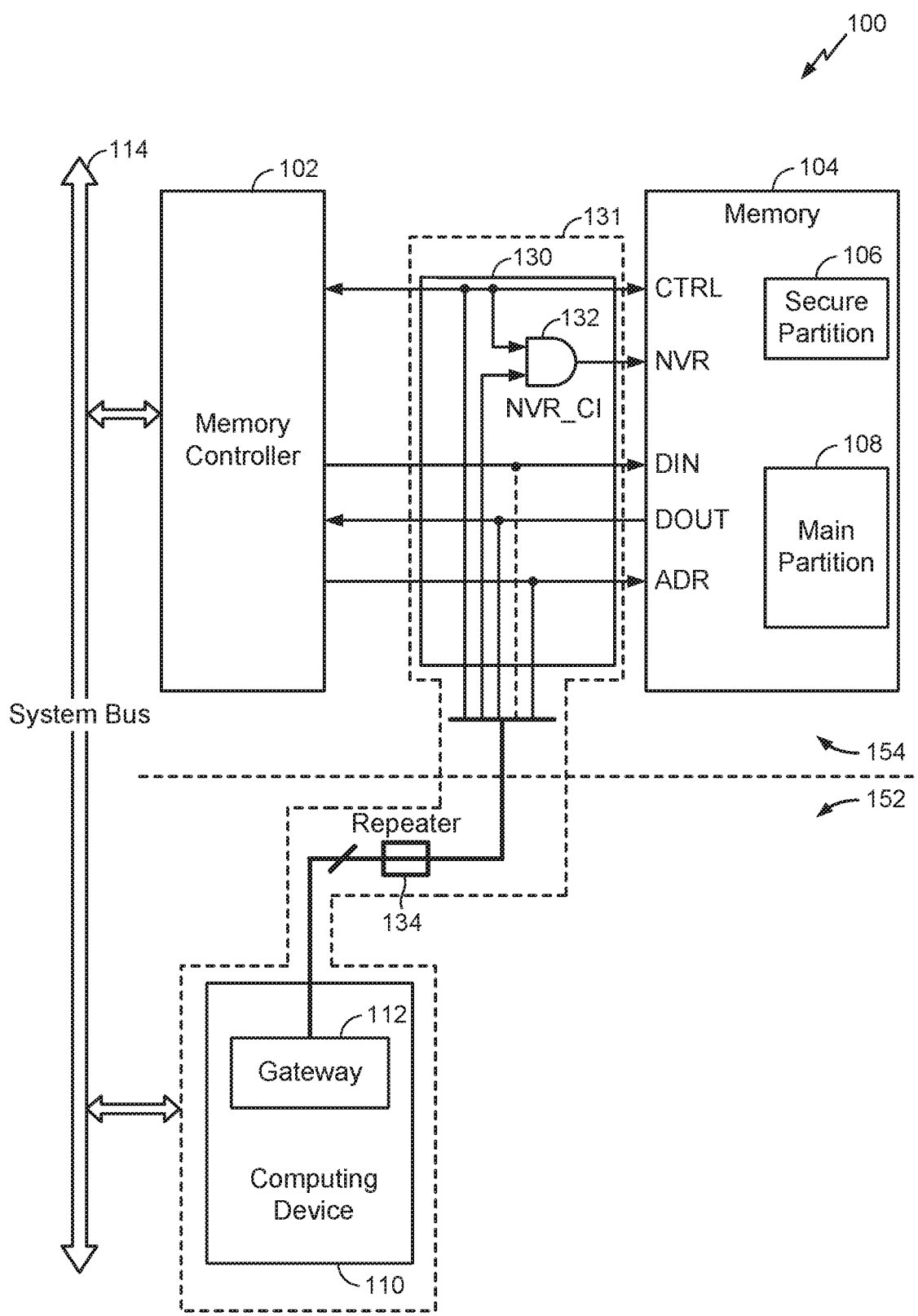
FIG. 1 is a schematic diagram of a system comprising a computing device and a memory controller coupled by a system bus according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

According to an embodiment, a secure enclave computing device may ensure integrity of values and/or parameters stored as signals and/or states in a physical memory device. For example, such a secure enclave computing device may ensure that values and/or parameters intended to be stored as signals and/or states in a physical memory device are protected from unauthorized access and/or corruption from inadvertent events and/or malicious attacks. In an implementation, a secure enclave computing device implemented within a larger computing environment may access and/or maintain a secure memory partition defined in one or more devices that are physically maintained in a trusted execution environment (TEE) separately from devices that are to maintain an unsecure memory in an untrusted execution environment (UEE). For example, such a separate secure memory may comprise physical memory devices within a secure enclave that are to be accessed through a trusted signal path by a separate, dedicated memory controller also maintained in a TEE.

In particular implementations of a mobile computing device, high levels of component integration may enable meeting particular design objectives and/or design requirements advantageous for mobile computing such as, for example, form factor, size, power and cost design objectives and/or design requirements. For example, integration of physical devices providing secure and unsecure memory partitions may enable using fewer components to assist in meeting such particular design objectives. Such integration of devices providing secure and unsecure memories, however, may introduce vulnerabilities of signals and/or states stored in a secure memory partition to malicious attacks and/or inadvertent events.

According to an embodiment, a memory providing unsecure and secure memory partitions may be implemented by one or more memory devices accessible by a single memory controller in a UEE and in an untrusted signal path. To store values and/or parameters in a portion of a secure memory partition, a secure enclave computing device may initiate transmission of one or more signals to a memory controller requesting an operation to write one or more expected and/or intended values and/or parameters to the portion of the secure memory partition. In an embodiment, a secure enclave computing device may monitor an interface between a memory controller and one or more memory devices to ensure that such a write operation is addressed to an expected and/or intended portion of a secure memory (e.g., and not to a portion of an unsecure memory). Here, bypassing such a memory controller in an untrusted signal path may enable a secure enclave computing device to ensure that a memory controller in an UEE does not complete operations to write secure values and/or parameters to an unsecure memory (e.g., to be accessible by devices outside of a TEE).

Following completion of a write operation to store values and/or parameters to a particular portion of a secure memory partition, a secure enclave computing device may initiate a "read back" operation to ensure that values and/or parameters expected and/or intended to be written to the secure memory partition are in fact stored in the particular portion of the secure memory partition. Here, such a secure enclave computing device may detect a state of a portion of a secure memory partition based, at least in part, on signals transmitted between the memory controller and the secure memory partition independently of receipt of messages from the memory controller (e.g., in an unsecure signal path). By comparing the one or more expected and/or intended parameters and/or values with a detected state of such a particular portion of a secure memory partition, a secure enclave computing device may confirm storage of one or more expected and/or intended values and/or parameters in the particular portion of the secure memory partition. Here, by bypassing a memory controller, a secure enclave computing device may reliably confirm storage of the one or more intended and/or expected parameters and/or values (e.g., without relying on receipt of messages from a memory controller in an untrusted signal path).

FIG. 1 is a schematic diagram of a system 100 comprising a computing device 110 and a memory controller 102 coupled by a system bus 114 according to an embodiment. According to an embodiment, components of system 100 may be integrated on a single circuit die as a "system on a chip" (SoC). For example, system 100 may be implemented as part of a mobile computing device designed to operate in a low-power environment and under small form factor design constraints. According to embodiment, system 100 may perform computing functions in a trusted execution environment (TEE) 152 and an untrusted execution environment (UEE) 154 coupled by system bus 114. UEE 154 may comprise a memory 104 capable of storing values and/or parameters for use performing computing tasks (e.g., executable instructions, input values, output values, intermediate values, etc.) as physical signals and/or states using any one of several volatile or non-volatile memory technologies. For example, memory 104 may comprise one or more types of non-volatile memory technologies including, for example, electrically erasable programmable read-only memory (EEPROM), ferroelectric random access memory (RAM), magnetic random access memory (MRAMs), phase change memory (PCM/PCRAM), resistive random access memory (ReRAM), correlated electron random access memory (CeRAM), just to provide a few examples. Alternatively, memory 104 may comprise a volatile memory technology such as a battery-backed SRAM. It should be understood, however, that these are merely examples of volatile and non-volatile memory technologies that may be used to implement one or more devices for memory 104, and that claimed subject matter is not limited in this respect. Additionally, while memory 104 is shown in FIG. 1 to comprise a single memory macro unit that is to be accessed by a single memory controller 102, it should be understood that in other embodiments memory 104 may comprise multiple instances of a memory macro that are to be accessed by a single memory controller coupled to system bus 114. In an embodiment, memory 104 may comprise memory cells (e.g., bitcells) capable storing representations of values, states, conditions, symbols and/or parameters as physical signals and/or states. Also, memory cells in memory 104 may be arranged in physical memory units (e.g., bytes, words, blocks, pages, etc.) that are addressable in memory operations according to physical addresses associated with such physical memory units. In a particular implementation, physical memory units in secure partition 106 may associated with and/or addressable by physical addresses in one or more contiguous or discontiguous ranges of physical addresses uniquely associated with physical units in secure partition 106 (e.g., as distinguished from physical addresses associated with physical memory units of memory 104 that are not in secure partition 106).

According to an embodiment, operations to access memory 104 (e.g., read, write and/or erase operations) may be initiated by memory controller 102 (e.g., responsive to communications and/or transactions on system bus 114). While operations to access to memory 104 may be initiated by memory controller 102, subsystem 131 may comprise circuitry 131 to at least in part monitor, regulate and/or control at least some communications between memory 104 and memory controller 102.

According to an embodiment, memory controller 102 may execute operations to access memory 104 by initiating and/or controlling write operations to store values, states, conditions, symbols and/or parameters in locations of memory 104 as physical signals and/or states, and/or read operations to detect physical signals and/or states expressing particular stored values, states, conditions, symbols and/or parameters. In an implementation, memory controller 102 may execute and/or control such write and/or read operations responsive to signals received on system bus 114. For example, memory controller 102 may receive signals comprising read commands transmitted on system bus 114 formatted to specify a location and/or locations in memory 104 (e.g., address or range of addresses of a particular byte, word, page and/or block) that is/are to be accessed for a read operation (e.g., detection/determination of values and/or parameters stored as signals and/or states). Memory controller 102 may also receive signals comprising write commands transmitted on system bus 114 formatted to specify parameters and/or values that are to be written (e.g., stored as signals and/or states) to a particular location and/or locations in memory 104 and an address of such a particular location and/or locations in memory 104.

According to an embodiment, memory 104 and memory controller 102 may be shared among devices in TEE 152 and UEE 154. For example, memory controller 102 may respond to read or write commands originating from devices in TEE 152 (e.g., computing device 110) and/or originating from device in UEE 154 (e.g., host processor, not shown). Memory 104 may be partitioned into at least a secure partition 106 and a main partition 108. According to an embodiment, to maintain integrity and security of values and/or parameters stored in secure partition 106, ability to access secure partition 106 may be limited to devices in TEE 152 such as computing device 110. In an example implementation, computing device 110 may comprise a secure enclave computing device. As discussed herein, Memory controller 102 may be permitted to complete read and/or write operations addressed to secure partition 106 responsive to commands originating at a device in TEE 152, but not permitted to complete read and/or write operations addressed to secure partition 106 responsive to commands originating at a device in UEE 154.

According to an embodiment, secure partition 106 may be defined by (and/or distinguished from main partition 108) by physical addresses and/or one or more ranges of addresses specifying physical memory locations that are to be reserved exclusively for secure partition 106 (and maintained in memory 104 separately from main memory 108). Operations to access to such memory locations (e.g., read and/or write operations directed to such memory locations) may be selectively permitted to be completed based, at least in part, on a state of hardwired circuitry 130 controlled by computing device 110.

As shown in the particular example implementation of FIG. 1, a signaling interface between memory controller 102 and memory 104 may be defined at least in part by device terminals CTRL, NVR, DIN, DOUT and ADR. In particular implementations, individual device terminals CTRL, NVR, DIN, DOUT and ADR may represent multiple individual physical signals on corresponding conductive elements and/or signal paths (e.g., for a terminal comprising a parallel interface) or a single physical signal on a single conductive element and/or signal path (e.g., for a terminal for a serial interface). As such, "terminal" as referred to herein may be implemented by single signal path (e.g., on a single conductive element) or multiple signal paths (e.g., on multiple conductive elements). Memory 104 may receive signals on terminal CTRL from memory controller 102 specifying a particular requested memory operation such as, for example, a read operation, write operation or erase operation, just to provide a few examples. Contemporaneous with specifying a particular memory operation on signals applied to terminal CTRL, memory controller 102 may apply signals to terminal ADR specifying an address indicative of a memory location (e.g., one or more associated memory cells in an array of memory cells) to which a memory operation is directed. Memory 104 may receive signals on terminal DIN indicative of and/or expressive of value and/or parameters that are to stored in a particular location of memory 104 as part of a write operation. Similarly, memory 104 may provide signals on terminal DOUT indicative and/or expressive of values and/or parameters that are read from a particular location of memory 104 as part of a read operation. In a particular implementation, and as discussed below, particular attempted read or write operations directed to a portion of secure partition 106 may be selectively enabled or disabled under certain conditions by applying a high or low signal to terminal NVR. It should be understood that a signaling interface between memory controller 102 and memory 104 may include additional signals and/or terminals including, for example, a clock signal (not shown).

In the presently illustrated embodiment, computing device 110 comprises a gateway 112 coupled to hardwired circuitry 130. Hardwired circuitry 130 may comprise control circuitry to monitor a signal interface between memory controller 102 and memory 104, and selectively control and/or enable completion of write and/or read operations directed to memory 104. In an embodiment, gateway 112 may comprise registers, fields and/or other temporary memory locations (not shown) to, at least in part, define how completion of write and/or read operations initiated by memory controller 102 is to be controlled. To physically connect to conductors in a signal interface between memory controller 102 and memory 104, hardwired circuitry 130 may be at least partially physically located in UEE 154, and thus may be vulnerable to physical attack. In one implementation, hardwired circuitry 130 may be physically shielded to reduce chances of corruption from a physical attack or an attempt to modify features of computing device 110 and/or contents of secure partition 106 without authorization. Additionally, interfaces with memory controller 102 and memory 104 defined on hardwired circuitry 130 may be configured such that no additional communication between memory controller 102 and memory 104 other than through hardwired circuitry 130. Additionally, repeater 134 may comprise buffer circuitry to enable transmission of signals between gateway 112 and a signaling interface between memory controller 102 and memory 104.

According to an embodiment, system 100 may be formed to be integrated in a single fabricated circuit die based, at least in part, on an integration of modules in a hardware description language (HDL) expressing features of subsystem 131, memory controller 102 and/or memory 104. According to an embodiment, an HDL module expressing features of subsystem 131 may be provided by a party different and/or distinct from parties providing HDL modules expressing features of other components of system 100 (e.g., memory controller 102 and/or memory 104). Here, such parties providing HDL modules expressing features of other components of system 100 may not be "trusted" entities in that features of the other components may be designed to breach security of subsystem 131 and/or memory states stored in secure partition 106. Accordingly, such a party providing HDL expressing features of subsystem 131 may have an interest in concealing features of subsystem 131 to prevent, for example, unauthorized copying or tampering.

In an embodiment, terminals for transmission of signals between and/or among components in system 100 may be at least in part implemented according to signal pins defined in interfaces of respective HDL modules expressing feature of these components. In the context of the present application, the term "signal pins" is understood to mean terminals formed according to a distinct module (e.g., a distinct module among multiple distinct modules formed in a single circuit die) that enable the distinct module to communicate signals with entities external to the module (e.g., other distinct modules formed in the single circuit die), and is not limited to conductive elements that extend externally from packaging of a distinct/finished component. For example, an HDL module expressing features of memory controller 102 may define an interface comprising signal pins to be connected to signal pins of memory 104 (e.g., where memory controller 102 and memory 104 are formed in a single circuit die). Likewise, an HDL module expressing features of memory 104 may define an interface comprising signal pins to be connected to signal pins of memory controller 102. According to an embodiment, an HDL module expressing features of subsystem 131 (including hardwired circuitry 130) may define an interface comprising signal pins to be connected to signal pins of memory controller 102, and an interface comprising signal pins to be connected to signal pins of memory 104. For example, hardwired circuitry 130 of subsystem 131 may provide an interposer device having first signal pins to directly couple to signal pins of memory controller 102, and comprise second signal pins to directly couple to signal pins of memory 104. In an implementation, signaling between signal pins of memory controller 102 and signal pins of memory 104 may be transmitted through hardwired circuitry 130. According to an embodiment, memory controller 102, memory 104 and hardwired circuitry 130 may be formed in a single circuit die such that hardwired circuitry 130 physically abuts memory controller 102 and/or physically abuts memory 104. As pointed out above, in an embodiment, certain communication with memory 104 may be initiated by memory controller 102 (e.g., including any command signals, sequencing and timing of signals, etc.) such that there is no dependency on hardwired circuitry 130. Additionally, all signal pins of a signaling interface of memory 104 may be connected and/or coupled to signal pins of hardwired circuitry 130 to prevent application of signals to any signal pins of the memory 104 independently of hardwired circuitry 130.

According to an embodiment, access to secure partition 106 (e.g., for a read or write operation) may be permitted and/or enabled by setting a signal on terminal NVR of memory 104 to be high. If memory controller 102 attempts a read, erase or write operation addressed to a portion of memory 104 while a signal on terminal NVR is low, for example, circuitry in memory 104 to carry out such a read, erase or write operation may be disabled, and an error message and/or error signal may be transmitted to memory controller 102 (e.g., as an error signal on terminal CTRL and/or an error message provided on system bus 114). In an implementation, hardwired circuitry 130 may comprise an AND gate 132 having an output terminal coupled to terminal NVR, a first input terminal to receive a first input signal from memory controller 102 on terminal CTRL and at least a second input terminal to receive a second input signal from gateway 112.

According to an embodiment, gateway 112 may maintain a map (e.g., in local memory registers, not shown) of physical addresses of memory 104 that map to physical memory locations within secure partition 106. Gateway 112 may also monitor memory addresses of memory 104 to which read and/or write operations are directed based, at least in part, on encoded signals provided by memory controller 102 to terminal ADR of memory 104. In an implementation, detecting an attempted read or write operation initiated by memory controller 102, gateway 112 may compare an address provided on terminal ADR to a map of physical addressed mapped to physical memory locations of secure partition 106 to determine whether the attempted read or write operation is directed to a portion of secure partition 106. If such an attempted read or write operation is directed to a portion of secure partition 106 (e.g., and is determined to have been initiated by an entity outside of TEE 152), gateway 112 may selectively provide a low signal to an input terminal of AND gate 132 to thereby provide a low signal to terminal NVR and prevent completion of the attempted read or write operation.

According to an embodiment, in the course of a read or write operation, gateway 112 (e.g., through hardwired circuitry 130) may observe signals transmitted between memory controller 102 and memory 104 to monitor and/or capture an address provided by memory controller 102 on terminal ADR and/or data-out signals provided by memory 104 on terminal DOUT, and selectively override signals applied by memory controller 102 to prevent completion of a memory operation, for example. In an implementation, secure partition 106 may be defined at least in part by one or more ranges of physical addresses within memory 104. As such, gateway 112 (e.g., through hardwired circuitry 130) may selectively override a memory operation initiated at memory controller 102 if an address associated provided on terminal ADR (and/or other control signal specifying a portion of memory such as page, block, etc.) is within a range defining a portion of secure partition 106. In an embodiment, memory controller 102 may directly access main partition 108 (e.g., by initiating memory operations addressed to a portion of main memory 108 including an address on terminal ADR that is not in a range defining secure partition 106) through hardwired logic 130, even if computing device 110 is powered down. Additionally, according to an embodiment, hardwired circuitry 131 may comprise no registers or other circuitry requiring clocking (e.g., responsive to a clock signa). As such, hardwired logic 130 may impart no additional latency to commands and/or messaging between memory controller 102 and memory 104.

For simplicity of explanation, the particular implementation of FIG. 1 shows a single AND gate 132 to selectively disable either read operations or write operations. In other embodiments, multiple AND gates may be used such as, for example, one AND gate to selectively disable read operations and a second AND gate to selectively disable write operations. Also, while an embodiment may be directed to providing an input signal from gateway 112 to a single signal path of AND gate 132 to selectively enable and/or disable a read or write operation, AND gate 132 may be replaced with an AND gate comprising three input terminals (to receive a signal provided to terminal CTRL on a first input terminal (e.g., three distinct signal paths) and a differential signal from gateway 112 on two additional input terminals.

Figure 2:
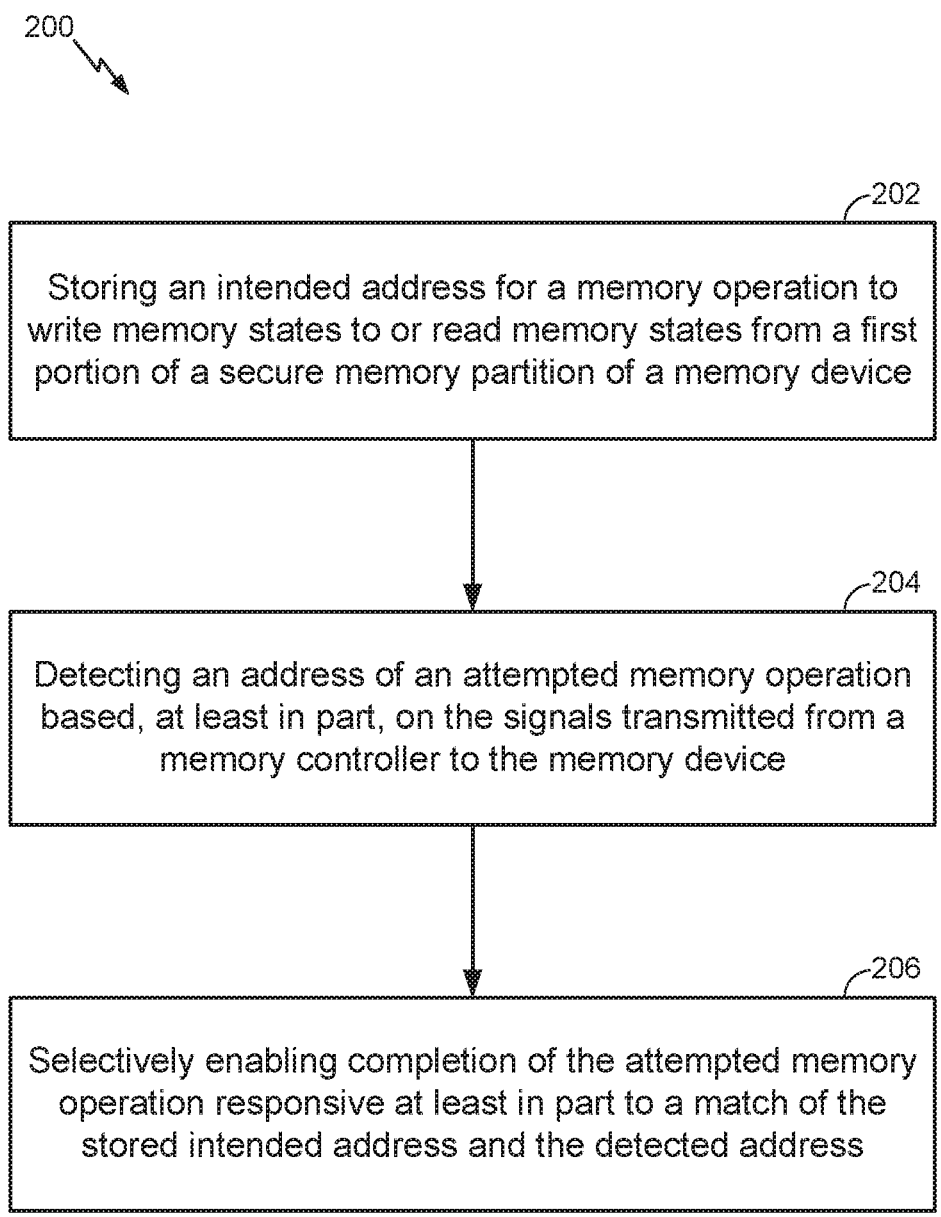
FIG. 2 is a flow diagram of a process to control access to a secure partition of a memory device according to an embodiment.

FIG. 2 is directed to, among other things, processes of protecting parameters and/or values stored in a secure portion of a memory device (e.g., secure partition 106) against unauthorized modification or updating at least in part by monitoring a signal interface between a memory controller (e.g., memory controller 102) and the memory device. Circuitry (e.g., hardwired circuitry 130 and/or gateway 112) may selectively override such attempts of unauthorized modification or updating of the secure portion and feedback an alert signal to an entity (e.g., computing device 110) that is to maintain and/or control parameters and/or values stored in the secure partition. In an implementation, such overrides may occur, at least in part, from an override of signals provided by the memory controller on the interface between the memory controller and the memory device.

FIG. 2 is a flow diagram of a process to control access to a secure partition of a memory device according to an embodiment, such as control of access to secure partition 106 for a read or write operation by controlling a signal on terminal NVR. In this context, a "write operation" as referred to herein means application of one or more signals to a memory device to affect a state of at least one memory unit in the memory device. For example, a write operation may comprise application of one or more signals to a memory device to store signals and/or states in a memory unit to represent and/or express one or more values, states, conditions, symbols and/or parameters. Also in this context, a "read operation" as referred to herein means application of one or more signals to a memory device to detect one or more signals and/or states stored in a memory unit. For example, a read operation may comprise detection of one or more stored signals and/or states that represent and/or express one or more values, states, conditions, symbols and/or parameters. According to an embodiment, access to a memory unit (e.g., memory 104) for a read or write operation may solely originate by a memory controller (e.g., memory controller 102) coupled to the memory unit. While gateway 112 may override such an operation initiated by a memory controller, gateway 112 may not initiate such a read or write operation. At block 202, computing device 110 may store in a register at gateway 112 an expected and/or intended address for a location in secure partition 106 (e.g., physical locations of memory units in secure partition 106) to which an expected and/or intended read or write operation is directed. In this context, a "secure memory partition" as referred to herein means a portion of one or more memory devices to which access is to be permitted by at least one entity (e.g., device, application and/or process) and to which access is to be limited and/or prohibited by at least one other entity. As pointed out above, a secure memory partition may be identified and/or defined at least in part by physical addresses associated with physical memory units in a secure memory partition. It should be understood, however, that this is merely an example implementation of a secure memory partition, and that claimed subject matter is not limited in this respect.

Following or contemporaneous with storage of an expected and/or intended address at block 202, computing device 110 may initiate a bus transaction on system bus 114 to transmit a read or write command to memory controller 102 (e.g., requesting a read or write operation). Responsive to receipt of such a read or write command, memory controller 102 may attempt a read or write operation. In this context, an "attempted memory operation" as referred to herein comprises generation of at least one signal indicative of a request to perform a read or write operation to a memory device. For example, such an attempted memory operation may comprise generating one or more signals on terminal CTRL and/or terminal ADR indicating a request to perform a read or write operation. In an embodiment, one or more signals provided on terminal CTRL to specify and/or execute an operation to access a portion of memory 104 may lead and/or precede one or more signals on terminal ADR to specify a physical address of memory 104 to which such an operation is directed. At block 204, gateway 112 at block 206 may monitor signals transmitted from memory controller 102 to memory 104 such as signals transmitted to terminals CTRL and ADR. According to an embodiment, gateway 112 at block 204 may detect an attempted read or write operation based, at least in part, on a decoding of signals transmitted to terminal CTRL and a decoding of signals transmitted to terminal ADR of memory 104. At block 206, an address detected at block 204 may be compared with an address stored at block 202 to determine a match, indicating that an address detected in an attempted memory operation initiated by memory controller 102 matches an expected and/or intended address of a previous command for a memory operation initiated by computing device 110. Responsive at least in part to detection of such a match, gateway 112 may affect a voltage on an input terminal of gate 132 to apply a high signal to terminal NVR to allow such an attempted memory operation to complete. If gateway 112 does not detect such a match, gateway 112 may affect a voltage on an input terminal of gate 132 to apply a low signal to terminal NVR to prevent completion of such a memory operation.

In a particular implementation, to enable completion of a read operation for access to a particular location in secure partition 106, computing device 110 at block 202 may program a read address register (RAR) (not shown) in gateway 112 to store an expected and/or intended read address and set a corresponding read enable (RE) field. Thus, to initiate a read operation to access values and/or parameters to a location in secure partition 106, computing device 110 may initiate a read command on system bus 114 (to memory controller 102) addressed to expected and/or intended read address(es) following programming RAR in gateway 112 with expected and/or intended read address(es), and setting field RE. At block 204, gateway 112, may monitor signals on a signal interface between memory controller 102 and memory 104 (e.g., monitor signals on terminals CTRL and ADR through hardwired circuitry 130). At block 206, gateway 112 may enable completion of an attempted read operation directed to an address in secure partition 106 that matches an address programmed in RAR by applying a signal to an input terminal of gate 132 to thereby provide a high signal at terminal NVR. If gateway 112 does not detect such a match, gateway 112 may prevent completion of such an attempted read operation directed to an address in secure partition 106 that does not match an address provided/identified in RAR. For example, determining that an address provided to terminal ADR in an attempted read operation is not the same address previously stored in RAR, gateway 112 may provide a low signal to an input of AND gate 132 to provide a low signal on terminal NVR (preventing completion of the attempted read operation).

Similarly, to enable completion of a write operation for access to a particular location in secure partition 106, computing device 110 at block 202 may program a write address register (WAR) (not shown) in gateway 112 to store expected and/or intended write address(es) for the particular location in secure partition 106, and set a write enable (WE) field. Thus, to initiate a write transaction to a location in secure partition 106, computing device 110 may initiate a write command on system bus 114 (to memory controller 102) addressed to expected write address(es) following programming register WAR with expected write address(es) (e.g., as specified in the write command on system bus 114) and setting field WE. Determining that an address provided to terminal ADR in a resulting attempted write operation matches a value written to WAR at block 204, gateway 112 at block 206 may provide a signal to an input terminal of AND gate 132 to provide a high signal on terminal NVR (enabling completion of the attempted write operation directed to a portion of secure partition 106). Otherwise, gateway 112 may prevent completion of such an attempted write operation directed to an address in secure partition 106 that does not match an address provided/identified in WAR. For example, determining that an address provided to terminal ADR in an attempted read operation is not the same address previously stored in WAR, gateway 112 may provide a low signal to an input of AND gate 132 to provide a low signal on terminal NVR (preventing completion of the attempted write operation).

Figure 3:
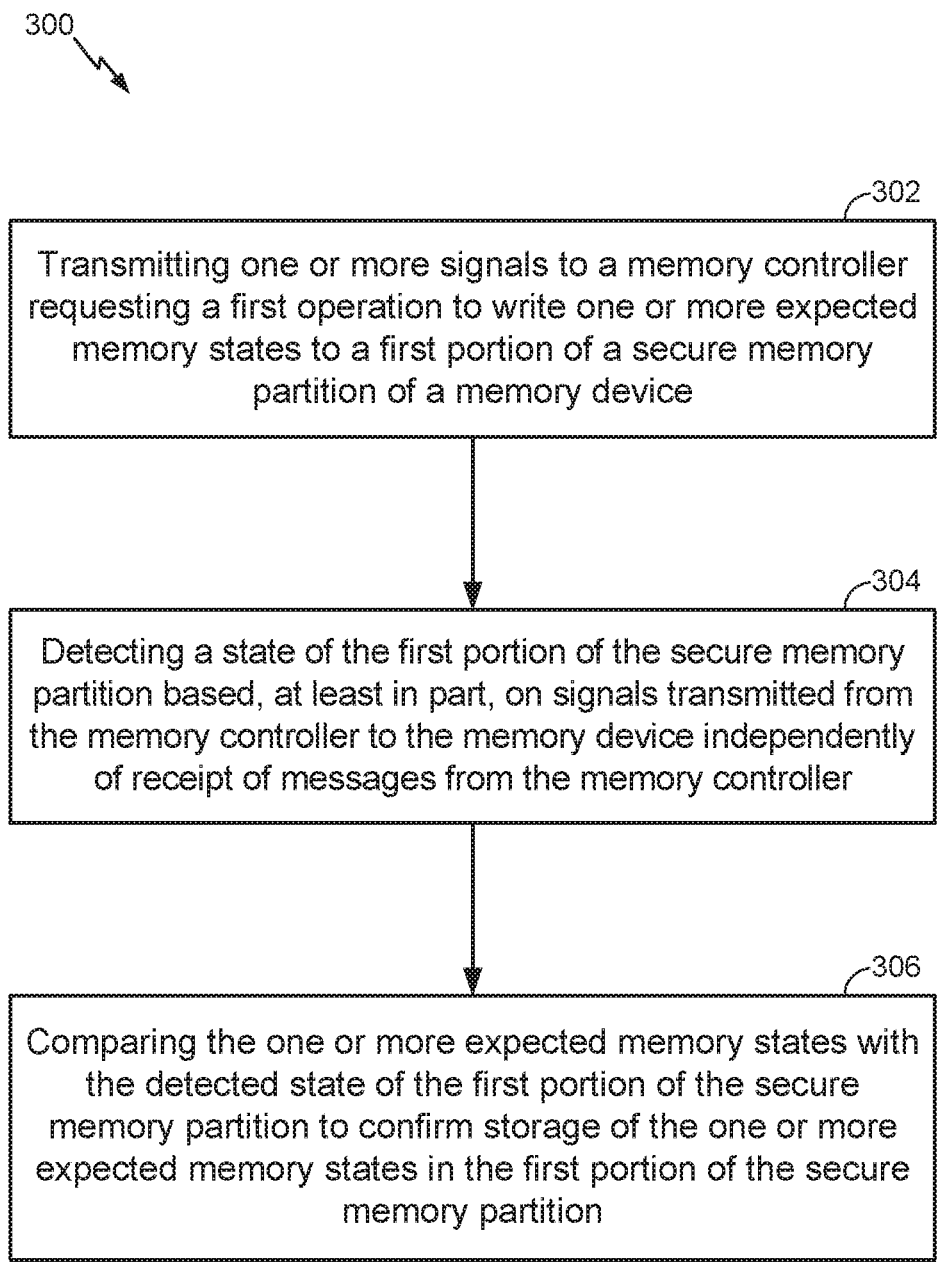
FIG. 3 is a flow diagram of a process of confirming values and/or parameters written to a portion of a secure partition of a memory according to an embodiment.

As pointed out above, with a possibility of malicious attacks and/or inadvertent events directed to secure partition 106, there may be an advantage to ensuring that parameters and/or values expected and/or intended to be written to a location in secure partition 106 in an expected and/or intended write operation are actually maintained as signals and/or states in secure partition 106 (e.g., and are not written to an unsecure portion of main partition 108). According to an embodiment, a computing device may perform process 300 as shown in FIG. 3 to "read back" following an attempted write operation directed to a portion of a secure memory such as secure partition 106. According to an embodiment, following a bus transaction on system bus 114 initiated by computing device 110 comprising a command for a write operation addressed to an expected and/or intended location in secure partition 106 initiated by computing device 110 at block 302, computing device 110 may initiate a subsequent read operation at block 304 to detect signals and/or states maintained and/or stored in the expected and/or intended location of secure partition 106. In an implementation, at block 304 computing device 110 may detect such signals and/or states maintained and/or stored in the expected and/or intended location of secure partition 106 independently of any additional actions by memory controller 102.

As pointed out above, memory controller 102 is located in UEE 154, and therefore is not part of a trusted signal path between secure partition 106 and TEE 152 Here, in bypassing memory controller 102 at block 304 to directly detect signals and/or states maintained and/or stored in a location of secure partition 106, computing device 110 may nevertheless ensure parameters and/or values expected and/or intended to be written to a location of secure partition 106 are actually maintained and/or stored in the location of secure partition 106. In an embodiment, computing device 110 may detect signals and/or states maintained and/or stored in an expected and/or intended portion of secure partition 106 based, at least in part, on signals transmitted from memory 104 on terminal DOUT synchronized with detection of initiation of a read operation at terminal CTRL and an encoded address at terminal ADR corresponding to the expected and/or intended portion of secure partition 106. Here, in bypassing memory controller 102 to detect signals on terminal DOUT, computing device 110 may detect a state (e.g., signals and/or states expressing/representing expected and/or intended values) in a portion of secure memory 106 independently of receipt of messages from memory controller 102. Such a state detected from bypassing memory controller 102 may provide greater confidence that values and/or parameters are stored in secure partition 106 as expected and/or intended.

In one embodiment, to detect a state of a portion of secure memory partition 106 at block 304, computing device 110 may initiate a bus transaction on system bus 114 to memory controller 102 comprising a command to initiate a read operation directed to the portion of secure partition 106. Following initiation of such a bus transaction, computing device 110 may monitor signals on terminals CTRL (e.g., to detect an attempted read operation), ADR (e.g., to detect a physical address to which an attempted read operation is directed) and/or DOUT (e.g., to detect signals and/or states stored at a physical address to which an attempted read operation is directed). Based, at least in part on signals provided to gateway 112 directly on terminal DOUT, computing device 110 at block 304 may detect a state of a portion of secure partition 106 to which a read operation is directed independently of receipt of any subsequent message from memory controller 102 (e.g., independently of any subsequent message from memory controller 102 received on system bus 114). In an alternative to initiating a bus transaction on system buss 114 to memory controller 102, computing device 110 may directly initiate a read operation (e.g., without initiating a bus transaction on system bus 114) by providing an appropriate signal on terminals CTRL (to provide a command to initiate such a read operation) and ADR (e.g., to specify an address of such a read operation).

According to an embodiment, gateway 112 may maintain registers (not shown) to record a history of write commands directed by computing device 110 directed to secure partition 106. For example, concurrently with initiating a bus transaction to memory controller 102 on system bus 114 comprising a command to initiate an intended and/or expected operation to write and/or store particular values and/or parameters to a location of secure partition 106 at a particular address, computing device 110 may locally store in registers of gateway 112 a record of the expected and/or intended write operation. Such a locally stored record may include, for example, an expected and/or intended address of a location of secure partition 106 (e.g., in WAR) and expected and/or intended parameters and/or values that are to be stored in the location of secure partition 106. This may enable gateway 112 at block 306 to compare locally stored values and/or parameters expected and/or intended to be written (from initiating bus transaction comprising a write command) with states of a portion of secure memory partition 106 detected at block 304, to thereby confirm that memory states written to memory 104 are expected and/or intended memory states.

In some implementations of a TEE, it may be advantageous for applications to maintain multiple copies of critical values and/or parameters in multiple different portions of a memory such as in secure partition 106. According to an embodiment, following block 306 in an initial iteration of process 300, in subsequent iterations computing device may repeat operations at blocks 302 through 306 to store expected and/or intended parameters and/or values in different portions of secure partition 106. At each such iteration of process 300 to store values and/or parameters to a portion of secure partition 106, a read operation may be initiated to access that portion of secure partition 106 to confirm to detect and/or resolve any inconsistencies. To enhance fault tolerance, portions in secure partition 106 to store expected and/or intended parameters and/or values may comprise non-contiguous memory locations in secure partition 106. In an embodiment, upon multiple iterations of process 300 to store expected and/or intended memory states in multiple corresponding distinct portions of memory 104, for example, values read back from the multiple distinct portions of memory 104 may be compared to detect errors and/or resolve any inconsistencies between and/or among memory stored in the multiple distinct portions of memory 104. In a particular implementation in which three iterations of process 300 store expected and/or intended memory states in three corresponding distinct portions of memory 104, a voting scheme may be used to determine the correct values. In another particular implementation in which two iterations of process 300 store expected and/or intended memory states in two corresponding distinct portions of memory 104, a simpler error detection mechanism may be sufficient for an application.

It should be noted that the various circuits disclosed herein may be described using computer aided design tools and expressed (or represented), as data and/or instructions embodied in various machine-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, system 100 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. An integrated circuit device comprising, on a single circuit die:
    circuitry to implement a memory macro having a first signal interface;
    circuitry to implement a memory controller having a second signal interface, wherein connection of signal pins on the second signal interface with corresponding signal pins on the first signal interface enables the memory controller to initiate operations via signals applied to the signal pins on the first signal interface from signals applied to the signal pins on the second signal interface; and
    circuitry to implement a subsystem comprising one or more computing devices and control circuitry, the control circuitry being coupled to the one or more computing devices and having hardwired circuitry interposed between the first signal interface and the second signal interface, the control circuitry to apply one or more signals to at least one of the signal pins on the first signal interface to control access to a partition of the memory macro dedicated to a computing entity of the one or more computing devices by memory operations initiated at the memory controller,
    wherein the control circuitry further to selectively apply an override signal via the hardwired circuitry to signals transmitted between the first signal interface and the second signal interface responsive to a determination that an attempt to complete a memory operation to access the partition of the memory macro dedicated to the computing entity was not initiated by the computing entity.

2. The integrated circuit device of claim 1, wherein the control circuitry comprises logic gates but no registers.

3. The integrated circuit device of claim 1, wherein the computing entity comprises a secure enclave computing device.

4. The integrated circuit device of claim 1, wherein the partition of the memory macro dedicated to the computing entity to comprise a secure partition dedicated to a secure enclave computing device, the secure partition to be defined at least in part by a range of addresses and/or memory specific control signals, and wherein the control circuitry to implement the subsystem further to comprise circuitry to the override signal to the first signal interface and/or the second signal interface responsive to an attempted operation to access a portion of the secure partition.

5. The integrated circuit device of claim 4, wherein the control circuitry to enable completion of memory operations initiated by the memory controller addressed to a portion of the memory macro outside of the secure partition regardless of whether the one or more computing devices are powered on.

6. The integrated circuit device of claim 4, and wherein the control circuitry is further to apply the override signal to signal pins of the first signal interface or to signal pins of the second signal interface responsive to detection of the attempt to complete the memory operation to access the partition of the memory macro dedicated to the computing entity, application of the override signal to prevent completion of the memory operation.

7. The integrated circuit device of claim 6, wherein the one or more computing devices are further to transmit one or more error signals to the memory controller responsive to application of the override signal.

8. The integrated circuit device of claim 1, and further comprising one or more features to prevent modification of features of the subsystem.

9. The integrated circuit device of claim 8, wherein the one or more features to prevent modification of features of the subsystem to further comprise implementation of the control circuitry so that all signal pins of the first signal interface are connected to the control circuitry to prevent application of signals to any signal pins of the memory macro independently of the control circuitry.

10. A method, at a subsystem formed in a single circuit die, comprising:
  observing, at control circuitry of the subsystem, signals transmitted between a memory controller and a memory macro, the memory controller and the memory macro being formed in the single circuit die, the signals being transmitted between signal pins on a signal interface of the memory controller and corresponding signal pins on a signal interface of the memory macro, to detect an attempt to complete a memory operation to access at least a dedicated partition of the memory macro, the dedicated partition of the memory macro being dedicated to a computing entity of the subsystem;
  communicating signals between the control circuitry and the computing entity to determine whether the attempt to complete the memory operation to access the at least the dedicated partition of the memory macro was initiated by the computing entity responsive to detection of the attempt; and
  selectively applying an override signal to the signals transmitted between the memory controller and the memory macro responsive to a determination that the attempt to complete the memory operation to access the dedicated partition of the memory macro was not initiated by the computing entity.

11. The method of claim 10, wherein memory operations to access the memory macro are completed by the memory controller via the signals transmitted between the memory controller and the memory macro.

12. The method of claim 10, wherein the memory operation to access the at least a partition of the memory macro dedicated to the computing entity of the subsystem comprises a read operation, and wherein communicating signals between the control circuitry and the computing entity further comprises forwarding from the control circuitry to the computing entity an address of the read operation and memory states detected from completion of the read operation.

13. The method of claim 10, wherein the memory operation to access the at least a partition of the memory macro dedicated to the computing entity of the subsystem comprises a write operation and/or erase operation, and wherein communicating signals between the control circuitry and the computing entity further comprises:
  forwarding from the control circuitry to the computing entity an address of the write operation and/or erase operation.

14. The method of claim 13, wherein the signals transmitted between the memory controller and the memory macro further comprise at least one control signal transmitted from the memory controller to the memory macro prior to transmission of the address of the write operation and/or erase operation to commit completion of the write operation and/or erase operation, and wherein selectively applying the override signal comprises selectively applying the override signal to the at least one control signal.

15. The method of claim 10, wherein the memory operation to access the at least a partition of the memory macro dedicated to the computing entity of the subsystem comprises a first write operation addressed to a first portion of the partition, the method further comprising:
  detecting, at the control circuitry, one or more memory states stored in the first portion of the dedicated partition of the memory macro subsequent to completion of the first write operation;
  comparing one or more expected and/or intended memory states with the detected one or more memory states stored in the first portion of the dedicated partition of the memory macro to confirm storage of the one or more expected and/or intended memory states in the first portion of the dedicated partition of the memory macro;
  detecting, at the control circuitry, memory states stored in a second portion of the dedicated partition of the memory macro subsequent to completion of a second write operation addressed to the second portion of the partition; and
  comparing one or more expected and/or intended memory states with the detected one or more memory states stored in the second portion of the dedicated partition of the memory macro to confirm storage of the one or more expected and/or intended memory states in the second portion of the dedicated partition of the memory macro.

16. The method of claim 10, the method further comprising:
  completing first, second and third write operations to store one or more expected and/or intended memory states in respective first, second and third portions of the dedicated partition of the memory macro;
  obtaining, at the computing entity, copies of memory states stored in the first, second and third portions of the dedicated partition of the memory macro; and
  comparing, at the computing entity, the copies of memory states stored in the first, second and third portions of the dedicated partition of the memory macro to resolve any inconsistencies between and/or among the memory states stored in the first, second and third portions of the dedicated partition of the memory macro.

17. The method of claim 16, and further comprising, at the computing entity, performing an integrity check on memory states stored in the first, second and third portions of the dedicated partition of the memory macro based, at least in part, on one or more expected characteristics of content to be expressed by the memory states stored in the first, second and third portions of the dedicated partition.

18. The method of claim 10, wherein the memory operation to access the at least a partition of the memory macro dedicated to the computing entity of the subsystem comprises a write operation and/or an erase operation, and wherein communicating signals between the control circuitry and the computing entity further comprises forwarding from the control circuitry to the computing entity an address of the write operation and/or the erase operation and memory states to be stored from the write operation and/or the erase operation.

19. The method of claim 18, wherein the signals transmitted between the memory controller and the memory macro further comprise at least one control signal transmitted from the memory controller to the memory macro prior to transmission of the address of the write operation and/or erase operation to commit completion of the write operation and/or erase operation, and wherein selectively applying the override signal comprises selectively applying the override signal to the at least one control signal.

20. The method of claim 18, and further comprising:
selectively permitting the write operation and/or erase operation responsive to a comparison of memory states to be stored from the write operation and/or erase operation as observed from signals transmitted between the memory controller and the memory macro with one or more expected and/or intended memory states stored in one or more registers of the computing entity.

21. The method of claim 10, the method further comprising:
completing first and second write operations to store one or more expected and/or intended memory states in respective first and second portions of the dedicated partition of the memory macro;
obtaining, at the computing entity, copies of memory states stored in the first and second portions of the dedicated partition of the memory macro; and
comparing, at the computing entity, the copies of memory states stored in the first and second portions of the dedicated partition of the memory macro to detect an error in storage of the one or more expected and/or intended memory states.

\* \* \* \* \*